US012698799B2

(12) United States Patent
Chollet et al.

(10) Patent No.: US 12,698,799 B2
(45) Date of Patent: Aug. 4, 2026

(54) BEARING DEVICE WITH INTEGRATED ELECTRICAL INSULATION, NOTABLY FOR AN ELECTRIC MOTOR OR MACHINE

(71) Applicant: AKTIEBOLAGET SKF, Gothenburg (SE)

(72) Inventors: Mickael Chollet, Joué-lès-Tours (FR); Anthony Simonin, Tours (FR); Benoit Arnault, Saint-Cyr-sur-Loire (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 19/081,186

(22) Filed: Mar. 17, 2025

(65) Prior Publication Data

US 2025/0297648 A1     Sep. 25, 2025

(30) Foreign Application Priority Data

Mar. 22, 2024    (FR) .................................. FR2402855

(51) Int. Cl.
 F16C 19/06        (2006.01)
 F16C 19/52        (2006.01)
        (Continued)
(52) U.S. Cl.
 CPC .............. F16C 19/52 (2013.01); F16C 19/06 (2013.01); F16C 33/586 (2013.01);
        (Continued)
(58) Field of Classification Search
 CPC ........ F16C 19/06; F16C 19/52; F16C 27/066; F16C 33/586; F16C 35/077;
        (Continued)

(56) References Cited

U.S. PATENT DOCUMENTS 1,329,720 A * 2/1920 Meier .................... H02K 5/173
                                                 384/462
2,283,839 A * 5/1942 Wright ................. H02K 5/1732
                                                 384/536

(Continued)

FOREIGN PATENT DOCUMENTS

DE      102019104702 A1     8/2020
DE      102020106338 A1 *   9/2021    .............. F16C 19/06

(Continued)

OTHER PUBLICATIONS

Preliminary Search Report from the French Patent Office dated Nov. 14, 2024 in related French application No. FR2402855, including Search Report and Written Opinion.

(Continued)

*Primary Examiner* — Phillip A Johnson
(74) *Attorney, Agent, or Firm* — J-TEK LAW PLLC; Scott T. Wakeman; Mark A. Ussai

(57) ABSTRACT

A bearing device includes a bearing having first and second rings and a bushing having a first cylindrical surface and a second cylindrical surface radially spaced from the first cylindrical surface. An electrically insulating insert is over-molded between and connects the first cylindrical surface of the bushing and the second cylindrical surface of the second ring. The first cylindrical surface of the bushing includes a first annular band of material projecting toward the second cylindrical surface of the second ring, the first annular band has a radial surface facing the second cylindrical surface of the second ring, the first annular band has an axial width less than the axial width of the bushing, and the radial surface of the first annular band is curved but does not lie on a single cylinder.

13 Claims, 4 Drawing Sheets

(51) Int. Cl.
    *F16C 33/58*        (2006.01)
    *F16C 35/077*     (2006.01)
    *H02K 5/173*      (2006.01)

(52) U.S. Cl.
    CPC ........... *F16C 35/077* (2013.01); *H02K 5/173*
        (2013.01); *F16C 2202/30* (2013.01); *F16C*
        *2226/70* (2013.01); *F16C 2380/26* (2013.01)

(58) Field of Classification Search
    CPC .............. F16C 2202/30; F16C 2226/70; F16C
        2380/26; H02K 5/173; H02K 5/1732;
        H02K 5/1735; H02K 5/1737
    See application file for complete search history.

(56)        References Cited

U.S. PATENT DOCUMENTS

| | | | |
|---|---|---|---|
| 5,733,120 | A | 3/1998 | Yao et al. |
| 11,002,315 | B2 * | 5/2021 | Stephan .................. F16C 33/60 |
| 12,104,650 | B2 | 10/2024 | Arnault et al. |
| 12,173,754 | B2 | 12/2024 | Arnault et al. |
| 12,196,263 | B2 | 1/2025 | Arnault et al. |
| 12,196,266 | B2 | 1/2025 | Chollet |
| 2014/0270616 | A1 | 9/2014 | Umemoto et al. |
| 2015/0155754 | A1 | 6/2015 | Ohashi et al. |
| 2023/0220874 | A1 | 7/2023 | Arnault et al. |
| 2023/0220881 | A1 | 7/2023 | Arnault et al. |
| 2023/0220882 | A1 | 7/2023 | Arnault et al. |
| 2023/0223813 | A1 | 7/2023 | Arnault et al. |

FOREIGN PATENT DOCUMENTS

| | | |
|---|---|---|
| DE | 102020114264 A1 | 12/2021 |
| DE | 102021109281 A1 | 10/2022 |
| FR | 3156173 A1 | 6/2025 |

OTHER PUBLICATIONS

Unpublished U.S. Appl. No. 19/081,200, first named inventor: Mickael Chollet, filed Mar. 17, 2025.
Unpublished U.S. Appl. No. 19/068,314, first named inventor: Benoit Arnault, filed Mar. 3, 2025.
Unpublished U.S. Appl. No. 19/068,333, first named inventor: Benoit Arnault, filed Mar. 3, 2025.

* cited by examiner

BEARING DEVICE WITH INTEGRATED ELECTRICAL INSULATION, NOTABLY FOR AN ELECTRIC MOTOR OR MACHINE

CROSS-REFERENCE

This application claims priority to French patent application no. 2402855 filed on Mar. 22, 2024, the contents of which are fully incorporated herein by reference.

TECHNOLOGICAL FIELD

The present disclosure relates to the field of bearings that are used in particular in electric motors, electric machines and associated apparatus.

BACKGROUND

In an electric motor or machine, at least one rolling bearing is mounted between the housing of the electric motor or machine and the rotary shaft in order to support this shaft. During operation, when the shaft is rotating, a difference in electrical potential can occur between the shaft and the housing of the electric motor or machine, thereby generating an electric current between the inner ring of the rolling bearing, which is rigidly connected to the shaft, and the outer ring, which is rigidly connected to the housing. The electric current flowing through the components of the rolling bearing can damage these components, notably the rolling elements and raceways provided on the inner and outer rings. Electrical discharges can also generate vibrations.

To overcome these drawbacks, it is known practice to replace the rolling elements of the bearing, which are made of the same steel as the inner and outer rings, with rolling elements made from ceramic. The expression "hybrid rolling bearing" is then generally used. However, such a hybrid rolling bearing is relatively expensive.

In order to overcome the aforementioned drawbacks, it is also known practice to equip the outer ring of the rolling bearing with an insulating sleeve provided with a bushing and with an insulating insert made of an electrically insulating material and positioned radially between the outer ring and the bushing. In order to attach the insulating insert to the outer ring and to the bushing without any additional elements or specific machining on the outer ring, the insulating insert can be overmolded. However, with such a solution, relative uncoupling of the insulating insert and the bushing can occur during operation.

SUMMARY

An aspect of the present disclosure is therefore to overcome the aforementioned drawbacks by providing a bearing device which has a simple and economical design.

Another aspect of the disclosure relates to a bearing device comprising a bearing having a first ring and a second ring that are able to rotate relative to one another. The device further comprises at least one insulating sleeve mounted on the second ring of the bearing. The insulating sleeve has a bushing and an insulating insert positioned radially between the second ring of the bearing and the bushing. The insulating insert is made of an electrically insulating material.

The bushing has a cylindrical annular outer surface and a cylindrical annular inner surface opposite to the outer surface. The insulating insert is overmolded onto the second ring of the bearing and at least onto one of the outer and inner surfaces of the bushing.

According to a general feature, the surface of the bushing comprises at least one projection which extends towards the second ring and is provided with a non-cylindrical annular surface radially facing the second ring. This provides a bearing device with integrated electrical insulation that is economical compared with conventional hybrid rolling bearings. Furthermore, the device is easy to manufacture and assemble into the associated electric motor or machine.

Furthermore, providing the projection with the non-cylindrical annular shape on the bushing makes it possible to obtain a good rigid connection with the insulating insert insofar as a complementary non-cylindrical annular shape is obtained on the insert during the overmolding. The risk of any relative movements between the insulating insert and the bushing in the circumferential direction is particularly limited, notably in the event of temperature variations. Moreover, the projection forms an axial abutment surface for limiting relative axial movements between the insulating insert and the bushing.

"Axial direction" is understood to mean the direction parallel to the axis of the bearing device.

"Circumferential direction" is understood to mean the direction that is perpendicular both to the axial direction and to a radius of the bearing device, in other words tangent to a circle centered on the axis of the bearing device. "Annular surface" is understood to mean a surface which, in a sectional view, forms a convex flat curve which is closed on itself.

The surface of the projection of the bushing may have, in a sectional view, two axes of orthogonal symmetry.

According to a first design, the surface of the projection of the bushing has, in a sectional view, an oblong shape. In this case, the surface of the projection of the bushing may have two diametrically opposite cylinder portions of different axes, and with two rectilinear portions connecting the cylinder portions to one another. Advantageously, the cylinder portions may be two semi-cylindrical portions.

According to a second design, the surface of the projection of the bushing has, in a sectional view, an oval shape. In this case, the surface of the projection of the bushing may be provided with two diametrically opposite first cylinder portions of different axes, and with two second cylinder portions which connect the first cylinder portions to one another and have different axes.

The bushing can be provided with two front faces delimiting its axial length. The projection may radially continue one of the front faces.

In a particular embodiment, the bushing is made of a metal material. The bushing can thus be easily machined to a predetermined radial tolerance.

According to a first design, the bushing delimits the outer surface of the device. In this case, the second ring is the outer ring of the bearing.

According to an alternative second design, the bushing delimits the inner surface of the device. In this case, the second ring is the inner ring of the bearing.

According to another design, a bearing device includes a bearing having a first ring and a second ring configured to rotate relative to each other, the second ring having a first cylindrical surface and a second cylindrical surface radially spaced from the first cylindrical surface, and a bushing having an axial length and a first cylindrical surface and a second cylindrical surface radially spaced from the first cylindrical surface of the bushing. An electrically insulating insert is overmolded between and connects the first cylindrical surface of the bushing and the second cylindrical surface of the second ring. The first cylindrical surface of the bushing includes a first annular band of material projecting toward the second cylindrical surface of the second ring, the first annular band of material has a radial surface facing the second cylindrical surface of the second ring, the first annular band of material has an axial width less than the axial width of the bushing, and the radial surface of the first annular band of material is curved but does not lie on a single cylinder.

If the insulating insert is made of a synthetic or elastomer material, it makes the device relatively insensitive to temperature variations.

In a particular embodiment, the bearing comprises at least one row of rolling elements disposed between raceways of the first and second rings. The rolling elements can be made of a metal material.

The disclosure also relates to an electric motor comprising a housing, a shaft and at least one bearing device as defined above and mounted radially between the housing and the shaft.

BRIEF DESCRIPTION OF THE DRAWINGS

The present invention will be better understood on studying the detailed description of embodiments, given by way of non-limiting example and illustrated by the appended drawings, in which.

DETAILED DESCRIPTION

Figure 1:
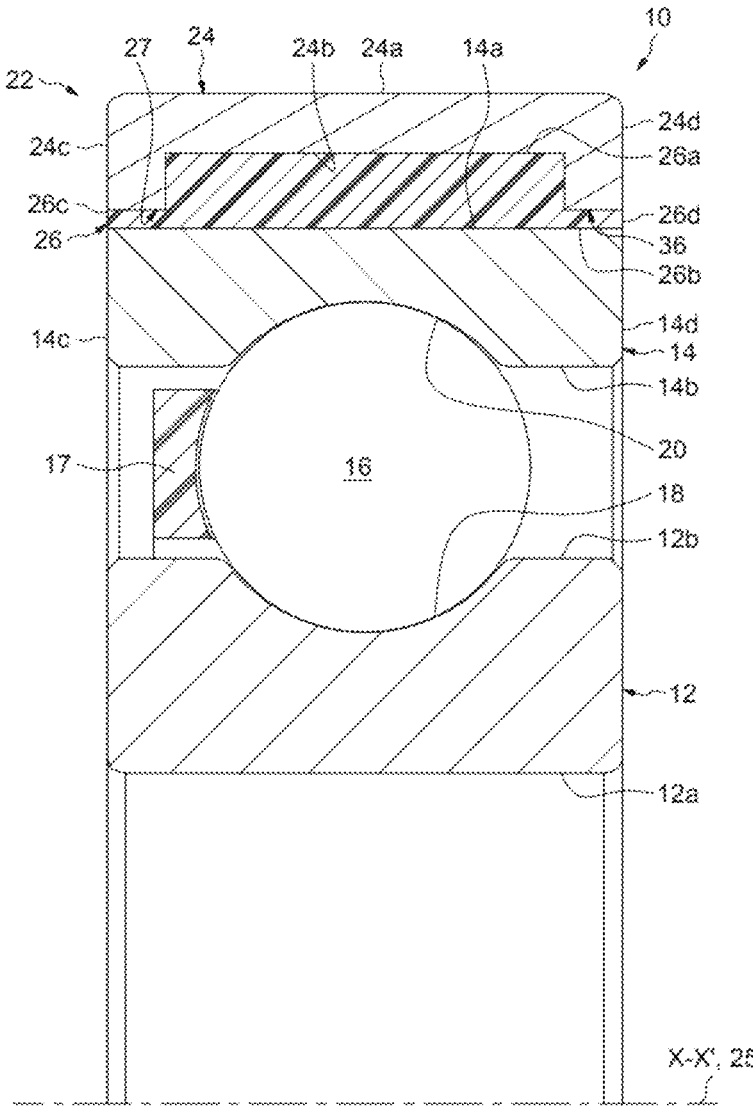
FIG. 1 is an axial sectional view through a portion of a bearing device according to an embodiment of the present disclosure.

The bearing device illustrated in FIG. 1 comprises a bearing 10 having a first ring 12 and a second ring 14 that are configured to rotate relative to one another about the axis X-X' of the bearing. In the illustrated embodiment, the first ring 12 is the inner ring of the bearing and the second ring 14 is the outer ring.

The bearing device is designed such that it does not conduct electric currents. The bearing device has integrated electric insulation.

The inner ring 12 and outer ring 14 of the bearing are concentric and extend axially along the axis X-X' of the bearing. The inner ring 12 and outer ring 14 are made of steel. The rings are of the solid type.

In the illustrated embodiment, the bearing 10 also comprises a row of rolling elements 16, in this case balls, positioned radially between the inner ring 12 and outer ring 14. The rolling elements 16 are made of steel. The bearing 10 also comprises a cage 17 for maintaining the even circumferential spacing of the rollers 16. The bearing 10 can also be equipped with seals or sealing flanges.

The inner ring 12 comprises a cylindrical bore 12a, a cylindrical axial outer surface 12b radially opposite the bore, and two opposite radially extending front faces (not referenced) axially delimiting the bore and the outer surface. The bore 12a and the outer surface 12b delimit the radial thickness of the inner ring 12. The bore 12a forms the inner surface of the inner ring. The inner ring 12 also has an inner raceway 18 for the rolling elements 16 that is formed on the outer surface 12b. The raceway 18 is directed radially outwards.

The outer ring 14 has a cylindrical axial outer surface 14a, a cylindrical bore 14b radially opposite the outer surface 14a, and two opposite radial front faces 14c, 14d axially delimiting the bore and the outer surface. The outer surface 14a and the bore 14b delimit the radial thickness of the outer ring 14. The outer ring 14 also has an outer raceway 20 for the rolling elements 16 that is formed on the bore 14b. The raceway 20 is directed radially inwards.

The bearing device also includes an electrically insulating sleeve 22 mounted on the outer ring 14. The insulating sleeve 22 is mounted on the outer surface 14a of the outer ring 14. The insulating sleeve 22 is rigidly connected to the outer ring 14. The insulating sleeve 22 comprises a bushing 24 and an insulating insert 26 positioned radially between the outer ring 14 and the bushing 24. The insulating insert 26 is overmolded onto the outer ring 14 and the bushing 24.

The bushing 24 is annular. The bushing 24 extends axially. The bushing 24 is made in this case in one piece. As an alternative, the bushing 24 could be made in multiple parts bearing against one another, for example two identical parts. The bushing 24 has a cylindrical annular axial outer surface 24a, and a cylindrical inner 24b which is radially opposite the outer surface 24a and of which the axis 25 is coaxial with the axis X-X'. The cylindrical inner surface 24b forms the inner surface of the bushing 24.

The bushing 24 also comprises two opposite radially extending front faces 24c, 24d axially delimiting the cylindrical inner surface and the outer surface. The front faces 24c, 24d delimit the axial length of the bushing. The outer surface 24a and the cylindrical inner surface 24b delimit the radial thickness of the bushing 24. The outer surface 24a of the bushing delimits the outer surface of the bearing device 10. In other words, the outer surface 24a defines the outside diameter of the bearing device 10.

Figure 2:
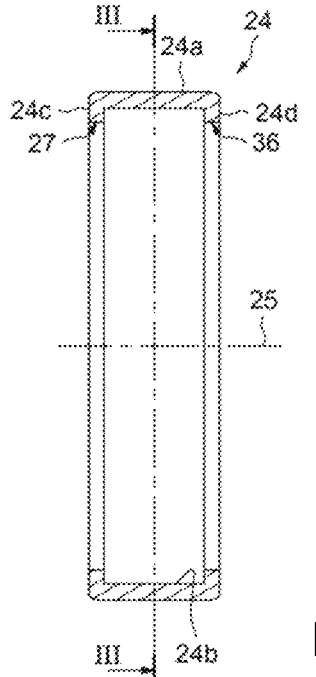
FIG. 2 is a sectional view of a bushing of the bearing device of FIG. 1.
Figure 4:
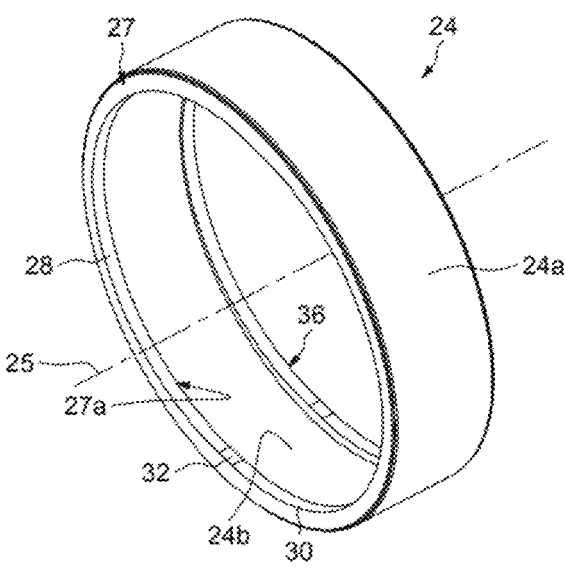
FIG. 4 is a perspective view of the bushing of FIG. 2.

As shown in FIGS. 1, 2 and 4, a first annular band of material 27 extends radially into the bushing from one axial end of the cylindrical inner surface 24b, i.e. towards the outer ring 14. The first annular band of material 27 is at an axial end of the bore 24b of the bushing. The first annular band of material 27 extends radially inward from the front face 24c of the bushing. The outer face of the first annular band of material 27 is coplanar with the front face 24c.

The first annular band of material 27 has a radially inner surface 27a oriented radially inwards, i.e. towards the outer ring 14. Portions of the radially inner surface 27a are not cylindrical.

Figure 3:
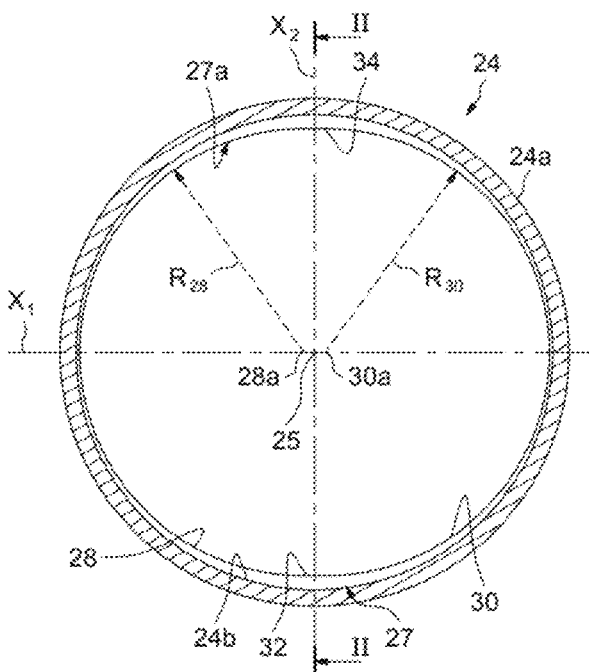
FIG. 3 is a sectional view along the axis III-III in FIG. 2.

As shown in FIGS. 3 and 4, in the exemplary embodiment illustrated, the radially inner surface 27a has two curved portions 28, 30 that are not coaxial and have different axes 28a, 30a, and two rectilinear portions 32, 34 that connect the curved portions to one another. The curved portions 28, 30 are diametrically opposite each other, and the rectilinear portions 32, 34 are diametrically opposite each other. The axes 28a, 30a are in the axial midplane of the bushing. The axes 28a, 30a are on either side of the axis 25 of the bore 24b of the bushing. The radii R28 and R30 of the curved portions 28, 30 are equal. As an alternative, the radii R28 and R30 of the semi-cylindrical portions 28, 30 could be different.

The rectilinear portion 32 connects a first end of the curved portion 28 to a first end of the curved portion 30, and the rectilinear portion 34 connects a second end of the curved portion 28 to a second end of the curved portion 30. The first and second ends of each curved portion 28, 30 delimit the curved portion in the circumferential direction. Each rectilinear portion 32, 34 is connected circumferentially on one side to the curved portion 28 and circumferentially on the other side to the curved portion 30. Each rectilinear portion 32, 34 extends in the continuation of the curved portions 28, 30 without a drop-off. The rectilinear portions 32, 34 are flat.

In a sectional or side view, the inner surface 27a of the first annular band of material 27 has two axes X1, X2 of orthogonal symmetry. The inner surface 27a has an oblong shape in a sectional or side view.

In the exemplary embodiment illustrated, the cylindrical inner surface 24b of the bushing comprises, at its other axial end, a second radially inwardly extending annular band of material 36 which extends towards the outer ring 14. The second annular band of material 36 extends relative to the cylindrical inner surface 24b. The annular band of material 36 extends radially inwardly from the front face 24d of the bushing. The outer face of the second annular band of material 36 is coplanar with the front face 24d.

In the exemplary embodiment illustrated, the second annular band of material 36 has a radial dimension equal to that of the first annular band of material 27. As an alternative, the second annular band of material 36 could have a radial dimension less than or greater than that of the first annular band of material 27. As an alternative, it could be possible to omit the second annular band of material 36. In the exemplary embodiment illustrated, the second annular band of material 36 has a curved but non-cylindrical inner surface identical to the curved inner surface 27a of the first annular band of material 27. As an alternative, the second annular band of material 36 could be angularly offset relative to the first annular band of material 27. According to another alternative, the curved inner surface of the second annular band of material 36 could be a cylindrical annular bore.

The bushing 24 is advantageously made of a metal material. This makes it possible to easily machine the outer surface 24a of the bushing to a predetermined tolerance as and when required. Preferably, the bushing 24 is made of steel. The bushing 24 can be obtained from a sheet-metal blank by cutting out, stamping and rolling. Alternatively, the bushing 24 can be obtained from a tube or from roll-forged blanks, or from sintering and stamping.

The insulating insert 26 is made of an electrically insulating material. The insulating insert 26 can be made, for example, of synthetic material, such as PEEK or PA46, or it can be made of elastomer material, such as rubber.

The insulating insert 26 is positioned radially between the outer surface 14a of the outer ring and the cylindrical inner surface 24b of the bushing. The insulating insert 26 covers the outer surface 14a of the outer ring. In this case, the insulating insert 26 completely covers the outer surface 14a in the axial and circumferential directions. The insulating insert 26 also covers the cylindrical inner surface 24b of the bushing. The insulating insert 26 also covers the curved inner surface 27a of the first annular band of material 27 and the curved inner surface of the second annular band of material 36. The insulating insert 26 in this case also completely covers these inner surfaces in the axial and circumferential directions.

As indicated above, the insulating insert 26 is overmolded onto the outer ring 14 of the bearing and onto the bushing 24. The insulating insert 26 is overmolded onto the outer surface 14a of the outer ring 14, onto the cylindrical inner surface 24b and onto the first and second annular bands of material 27, 36 of the bushing 24.

The insulating insert 26 is annular. The insulating insert 26 extends axially. The insulating insert 26 comprises an axial outer surface 26a, a cylindrical bore 26b radially opposite the outer surface 26a, and two opposite radial front faces 26c, 26d axially delimiting the bore and the outer surface. The front faces 26c, 26d axially delimit the insulating insert 26. The outer surface 26a and the bore 26b delimit the radial thickness of the insulating insert 26. The outer surface 26a is in radial contact with the cylindrical inner surface 24b of the bushing and with the projections 27, 36. The cylindrical bore 26b of the insert is in radial contact with the outer surface 14a of the outer ring.

The outer surface 26a of the insulating insert has a complementary shape to the cylindrical inner surface 24b of the bushing and to the first and second annular bands of material 27, 36, and thus has a stepped shape. In the area of each of the first and second annular bands of material 27 and 36, the outer surface 26a is thus provided with two complementary semi-cylindrical portions to the semi-cylindrical portions 28, 30, and with two complementary rectilinear portions to the rectilinear portions 32, 34.

In the illustrated embodiment, the faces 14c, 26c, 24c and 14d, 26d, 24d of the outer ring, the insulating insert and the bushing are respectively coplanar.

Alternatively, other arrangements can be provided. For example, the insulating insert 26 could have a reduced axial dimension and remain axially set back from the faces 14c, 14d of the outer ring. Alternatively, the insulating insert 26 could have a greater axial dimension and axially project from the faces 14c, 14d of the outer ring. In this case, the insulating insert 26 can at least partly cover these faces 14c, 14d. As a variant, the insulating insert 26 could at least partly cover the faces 24c, 24d of the bushing.

In another alternative, or in combination, the bushing 24 could axially project from the insulating insert 26 relative to the faces 26c and 26d, or could remain axially set back from these faces.

The bearing device is manufactured as follows.

In a first step, the bearing 10 and the bushing 24 equipped with the first and second annular bands of material 27, 36 are mounted inside a mold, which is provided for the overmolding of the insulating insert 26. In this position mounted inside the mold, the bushing 24 is radially spaced apart from the outer ring 14 of the bearing. Then, in a subsequent second step, the insulating insert 26 is overmolded both onto the outer ring 14 of the bearing and onto the bushing 24. Finally, the bearing device, which is in the form of a unitary assembly, is removed from the mold.

Figure 5:
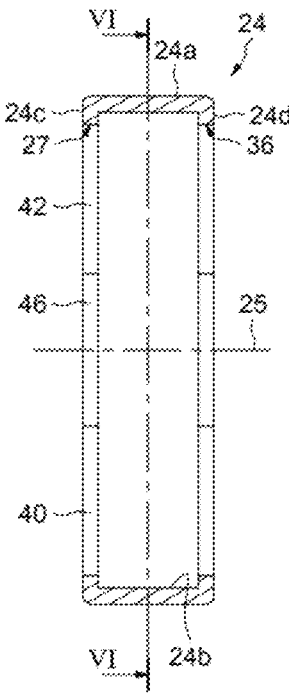
FIG. 5 is a sectional view of a bushing usable in a bearing device according to another embodiment of the present disclosure.
Figure 6:
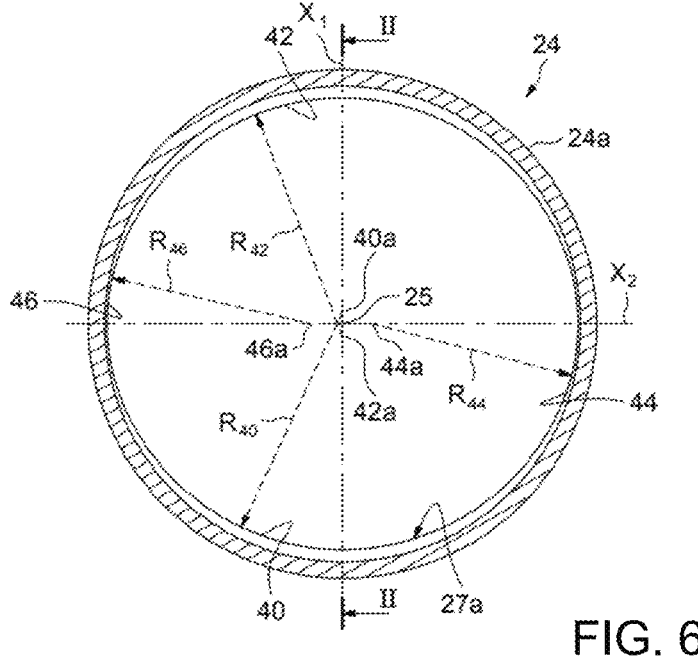
FIG. 6 is a sectional view along the axis VI-VI in FIG. 5.
Figure 7:
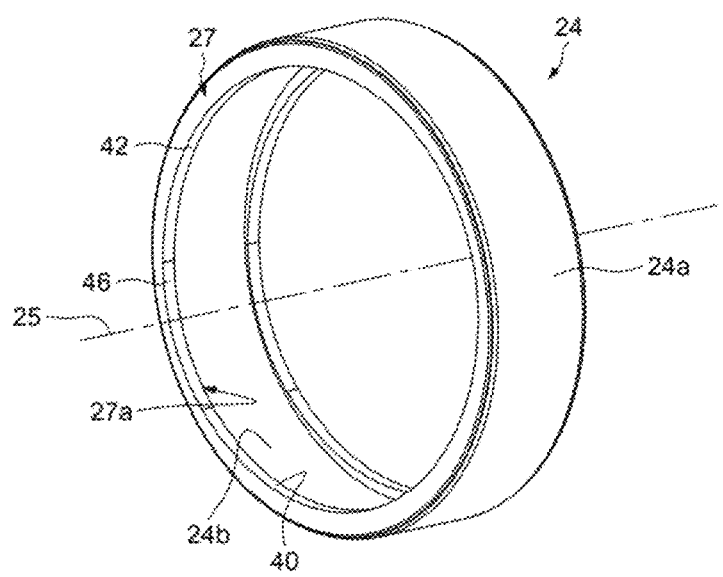
FIG. 7 is a perspective view of the bushing of FIG. 5.

In the exemplary embodiment illustrated in FIGS. 5 to 7, in which elements that are identical have the same references, the curved inner surface 27a of the annular band of material 27 is also non-cylindrical, but in this case is provided with first cylinder portions 40, 42 of different axes 40a, 42a, and with two second cylinder portions 44, 46 which connect the first cylinder portions to one another and have different axes 44a, 46a. The first cylinder portions 40, 42 are diametrically opposite. The second cylinder portions 44, 46 are diametrically opposite.

The axes 40a, 42a are in the radial midplane of the bushing. The axes 40a, 42a are on either side of the axis 25 of the cylindrical inner surface 24b of the bushing. The radii R40 and R42 of the cylinder portions 40, 42 are equal. The axes 44a, 46a are different from the axes 40a, 42a. The axes 44a, 46a are in the axial midplane of the bushing. The axes <table>
<tr><td>7</td><td>8</td></tr>
</table>

44a, 46a are on either side of the axis 25 of the cylindrical inner surface 24b of the bushing. The radii R44 and R46 of the cylinder portions 44, 46 are equal and less than the radii R40 and R42.

The second cylinder portion 44 connects a first end of the first cylinder portion 40 to a first end of the first cylinder portion 42, and the second cylinder portion 46 connects a second end of the first cylinder portion 40 to a second end of the first cylinder portion 42. The first and second ends of each cylinder portion 40, 42 delimit the cylinder portion in the circumferential direction.

Each second cylinder portion 44, 46 is connected circumferentially on one side to the first cylinder portion 40 and circumferentially on the other side to the first cylinder portion 42. Each second cylinder portion 44, 46 extends continuously from the first cylinder portions 40, 42 without a drop-off.

In a sectional or side view, the curved inner surface 27a of the projection has two axes X1, X2 of orthogonal symmetry. The curved inner surface 27a has an oval shape in a sectional or side view.

In the exemplary embodiment illustrated, the second annular band of material 36 of the bushing has a non-cylindrical curved inner surface identical to the bore 27a of the projection 27. As an alternative, the second annular band of material 36 could be angularly offset relative to the first annular band of material 27. According to another alternative, the curved inner surface of the second annular band of material 36 could be cylindrical. In another alternative, the second annular band of material could be omitted.

In the illustrated embodiments, the first ring 12 of the bearing is the inner ring and the second ring 14, onto which the insulating insert 26 is overmolded, is the outer ring.

As an alternative, it is possible to provide a reverse arrangement, in which the second ring 14, onto which the insulating insert 26 is overmolded, is the inner ring. In this case, the insulating sleeve is located in the bore 12a of the inner ring. The insulating insert is then positioned radially between the bore 12a of the inner ring and the outer surface of the bushing. The insulating insert is overmolded onto the inner ring and at least onto the outer surface of the bushing. The outer surface of the bushing is provided with one or more projections provided with a non-cylindrical outer surface. The bore of the bushing delimits the bore of the bearing device.

In the described embodiments, the bearing of the device is provided with a single row of rolling elements. In a variant, the bearing can be provided with several rows of rolling elements. In addition, the rolling bearing can include types of rolling elements other than balls, for example rollers. In another variant, the bearing can be a plain bearing devoid of rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:
   a bearing including a first ring and a second ring configured to rotate relative to each other, the second ring having a first cylindrical surface and a second cylindrical surface radially spaced from the first cylindrical surface,
   a bushing having an axial length and a first cylindrical surface and a second cylindrical surface radially spaced from the first cylindrical surface of the bushing, and
   an electrically insulating insert overmolded between and connecting the first cylindrical surface of the bushing and the second cylindrical surface of the second ring,
   wherein the first cylindrical surface of the bushing includes a first annular band of material projecting toward the second cylindrical surface of the second ring,
   wherein the first annular band of material has a radial surface facing the second cylindrical surface of the second ring,
   wherein the first annular band of material has an axial width less than the axial width of the bushing, and
   wherein the radial surface of the first annular band of material is curved but does not lie on a single cylinder.

2. The bearing device according to claim 1,
   wherein the radial surface of the first annular band of material has, in a sectional view, exactly two axes of orthogonal symmetry.

3. The bearing device according to claim 2,
   wherein the radial surface of the first annular band of material has an oblong shape in a sectional view.

4. The bearing device according to claim 3,
   wherein the radial surface has a first portion lying on a first cylinder having a first longitudinal axis and a second portion lying on a second cylinder having a second cylindrical axis spaced from the first cylindrical axis.

5. The bearing device according to claim 4,
   wherein the radial surface has a first planar portion connecting a first circumferential end of the first portion to a first circumferential end of the second portion and a second planar portion connecting a second circumferential end of the first portion to a second circumferential end of the second portion.

6. The bearing device according to claim 5,
   wherein the first portion is a first half cylinder and the second portion is a second half cylinder.

7. The bearing device according to claim 4,
   wherein the radial surface has a third portion connecting a first circumferential end of the first portion to a first circumferential end of the second portions, the third portion lying on a third cylinder having a third axis spaced from the first axis and from the second axis.

8. The bearing device according to claim 7, wherein the radial surface has a fourth portion connecting a second circumferential end of the first portion to a second circumferential end of the second portions, the fourth portion lying on a fourth cylinder having a fourth axis spaced from the first axis and from the second axis and from the third axis.

9. The bearing device according to claim 8, wherein the first axis, the second axis, the third axis and the fourth axis all lie in a mid plane of the bushing.

10. An electric motor comprising:

a housing, a shaft, and at least one bearing device according to claim 9 mounted radially between the housing and the shaft.

11. The bearing device according to claim 1, wherein the radial surface of the first annular band of material has an oval shape in a sectional view.

12. The bearing device according to claim 1, wherein the bushing is made of metal.

13. An electric motor comprising:

a housing, a shaft, and at least one bearing device according to claim 1 mounted radially between the housing and the shaft.

* * * * *